United States Patent [19]

O'Donnell

[11] Patent Number: 5,551,373

[45] Date of Patent: Sep. 3, 1996

[54] PORTABLE PET BOOSTER SEAT APPARATUS

[76] Inventor: Norman J. O'Donnell, 3 Andromeda Ct., Greenville, S.C. 29615

[21] Appl. No.: 514,406

[22] Filed: Aug. 11, 1995

[51] Int. Cl.$^6$ ............................. A01K 1/035; A01K 29/00
[52] U.S. Cl. ....................... 119/28.5; 119/771; 297/487; 297/256.15
[58] Field of Search .................................. 119/28.5, 771; 297/464, 469, 487, 488, 256.15

[56] References Cited

U.S. PATENT DOCUMENTS

| D. 268,630 | 4/1983 | Wilson | D6/333 |
|---|---|---|---|
| D. 283,855 | 5/1986 | Kujawski | D6/333 |
| D. 324,611 | 3/1992 | Sedlack | D6/333 |
| D. 348,783 | 7/1994 | Young | D6/333 |
| 2,979,121 | 4/1961 | Gates | 297/487 X |
| 4,512,286 | 4/1985 | Rux | 119/771 |
| 4,597,359 | 7/1986 | Moorman | 119/28.5 |
| 4,889,388 | 12/1989 | Hime | 297/464 |
| 4,924,814 | 5/1990 | Beaudet | 119/771 X |
| 5,044,321 | 9/1991 | Selph | 119/19 X |
| 5,133,294 | 7/1992 | Reid | 119/771 |
| 5,275,464 | 1/1994 | Eichhorn et al. | 297/488 |
| 5,277,148 | 1/1994 | Rossignol et al. | 119/19 |
| 5,474,329 | 12/1995 | Wade et al. | 280/749 |

Primary Examiner—Robert P. Swiatek
Assistant Examiner—Elizabeth Shaw

[57] ABSTRACT

A portable pet booster seat apparatus includes a base portion which includes a top surface and a support portion. A first wall portion is connected to the base portion at a first peripheral portion of the base portion. The first wall portion projects upward above the top surface of the base portion. A second wall portion is connected to the base portion at a second peripheral portion of the base portion. The second wall portion projects upward above the top surface of the base portion. A pair of gaps are provided between the first wall portion and the second wall portion. The base portion may include four sides. The first wall portion of the portable pet booster seat apparatus extends along a first side of the base portion. The second wall portion includes a first wall segment, a second wall segment, and a third wall segment. The first wall segment extends along a second side of the base portion. The second wall segment extends partially along a third side of the base portion leaving a gap between the second wall segment and the first wall portion. The third wall segment extends partially along a fourth side of the base portion leaving a gap between the third wall segment and the first wall portion. The portable pet booster seat apparatus may also include a removable and replaceable cover assembly. The cover assembly includes an elastic portion for securing the cover assembly to the base portion.

3 Claims, 3 Drawing Sheets

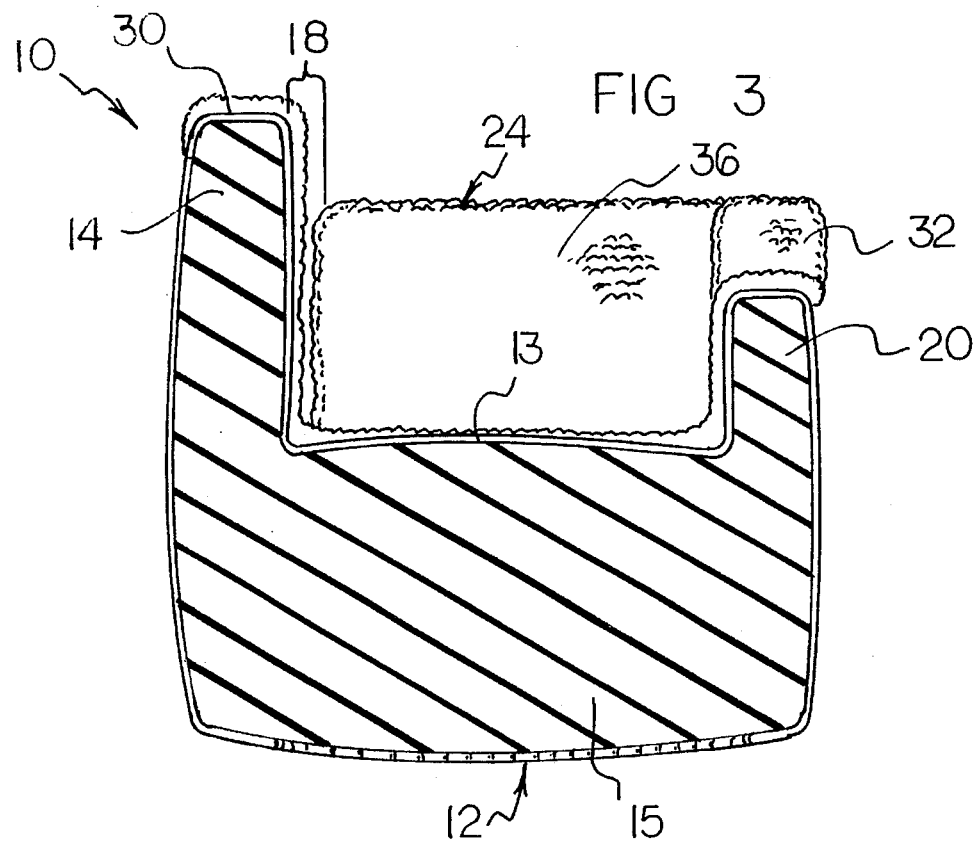
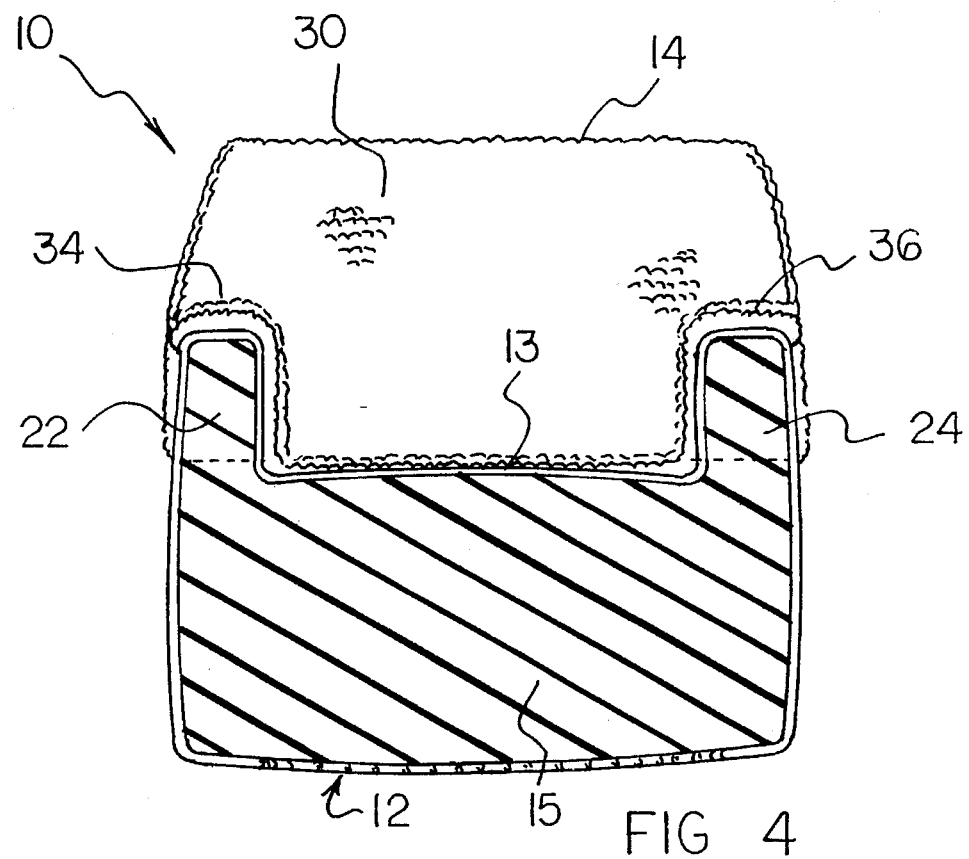

PORTABLE PET BOOSTER SEAT APPARATUS

BACKGROUND OF THE INVENTION

1. Field of the Invention

The present invention relates generally to portable seats and, more particularly, to portable seats especially adapted for use in a vehicle for boosting the vertical position of a pet.

2. Description of the Prior Art

Just as with people, when pets are being transported in a motor vehicle, the pets often prefer to look out of a window. For relatively large pets, such large pets can sit on a seat in a motor vehicle and easily look out of a window. For relatively small pets, however, it may not be possible for the pet to sit on the vehicle seat and be able to look out of a window. Just as small people, such as toddlers, may need a booster seat to enable them to look out of a vehicle window when seated, a small pet may also need some sort of booster device to enable the small pet to see out of a vehicle window.

In the prior art, a pet carrier that is used in a motor vehicle is disclosed in U.S. Pat. No. 5,044,321. More specifically, U.S. Pat. No. 5,044,321 discloses a restraining pouch that is suspended from two independent side-by-side seats. The restraining pouch is elevated in a vertical direction so that, in the elevated position, the pet is able to see out of a window in the vehicle. One feature of the restraining pouch is that it prevents from pet from exercising any mobility. A pet may become impatient and bored at being immobilized for an extended period of time. In this respect, it would be desirable if a pet booster device can boost a pet in a motor vehicle without substantially immobilizing the pet. Furthermore, another feature of the restraining device is that it requires that the restraining device be suspended from two adjacent independent seat structures. Such a suspension mechanism would not be possible for a motor vehicle that includes bench seats. In this respect, it would be desirable if a pet booster device were provided that is readily usable in motor vehicles that have bench seats. In addition, with this device, the weight of the pet is born by the suspension straps. If the pet is relatively heavy, such suspension straps may be prematurely worn and may undergo premature failure. In this respect, it would be desirable if a pet booster device were provided which does not employ suspension straps at all for maintaining the pet in an elevated position with respect to a vehicle window.

As mentioned hereinabove, human infants and toddlers may need some sort of booster seat to permit them to see out of vehicle windows. The following U.S. patents disclose some booster seats used for infants and toddlers in motor vehicles: U.S. Pat. No. 5,275,464; Pat. No. Des. 268,630; Pat. No. Des. 283,855; Pat. No. Des. 324,611; and Pat No. Des. 348,783. It is noted that one particular characteristic of the human booster seats is common to all of the seats. A provision is made at the front of each seat for the legs of the infant or child to let the legs hang over the front of the seat. Such a feature may be useful for a human infant or toddler. However, for a booster seat that is used for a pet, such a provision is undesirable. If a pet is seated on a booster support, and the pet's front legs would move off of the top surface of the booster support, the pet would probably fall on its face. With this in mind, it would be desirable if a pet booster device had a feature which prevents a pet's front legs from moving off of the top surface of a booster support.

As a matter of interest, U.S. Pat. No. 5,277,148 discloses a wearable pet enclosure which is not used as a booster seat in a motor vehicle.

Still other features would be desirable in a portable pet booster seat apparatus. For example, motor vehicles have seat belts and shoulder harnesses. In this respect, it would be desirable if a portable pet booster seat apparatus were provided which has a feature for engaging a portion of a seat belt or shoulder harness.

When a pet is taken on an overnight trip, the pet may not feel comfortable in sleeping in a new environment. For example, if a pet is accustomed to sleeping in a pet bed, the pet bed may not be available in the location slept in overnight. To avoid this problem, it would be desirable if a pet booster device were provided that can also serve as a portable pet bed.

Any piece of furniture that is often used for supporting a pet is subject to the accumulation of pet hair and other debris. In this respect, for convenience and sanitary purposes, it would be desirable if a pet booster device had an easily removable and easily laundered cover.

Thus, while the foregoing body of prior art indicates it to be well known to use a portable pet booster device, the prior art described above does not teach or suggest a portable pet booster seat apparatus which has the following combination of desirable features: (1) can boost a pet in a motor vehicle without substantially immobilizing the pet; (2) is readily usable in motor vehicles that have bench seats; (3) does not employ suspension straps for maintaining the pet in an elevated position with respect to a vehicle window; (4) prevents a pet's front legs from moving off of the top surface of a booster support; (5) has a feature for engaging a portion of a seat belt or shoulder harness; (6) can also serve as a portable pet bed; and (7) has an easily removable and easily laundered cover. The foregoing desired characteristics are provided by the unique portable pet booster seat apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a portable pet booster seat apparatus which includes a base portion which includes a top surface and a support portion. A first wall portion is connected to the base portion at a first peripheral portion of the base portion. The first wall portion projects upward above the top surface of the base portion. A second wall portion is connected to the base portion at a second peripheral portion of the base portion. The second wall portion projects upward above the top surface of the base portion. A pair of gaps are provided between the first wall portion and the second wall portion.

The base portion may include four sides. The first wall portion of the portable pet booster seat apparatus extends along a first side of the base portion. The second wall portion includes a first wall segment, a second wall segment, and a third wall segment. The first wall segment extends along a second side of the base portion. The second wall segment extends partially along a third side of the base portion leaving a gap between the second wall segment and the first wall portion. The third wall segment extends partially along a fourth side of the base portion leaving a gap between the third wall segment and the first wall portion.

The portable pet booster seat apparatus may also include a removable and replaceable cover assembly which includes a first cover portion for covering the first wall portion, a second cover portion for covering the first wall segment of the second wall portion, a third cover portion for covering the second wall segment of the second wall portion, a fourth cover portion for covering the third wall segment of the second wall portion, and a fifth cover portion for covering the base portion. The cover assembly includes a cover spacing between the third cover portion and the first cover portion and includes a cover spacing between the fourth cover portion and the first cover portion. The cover assembly includes an elastic portion for securing the cover assembly to the base portion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable pet booster seat apparatus which has all of the advantages of the prior art and none of the disadvantages.

It is another object of the present invention to provide a new and improved portable pet booster seat apparatus which may be easily and efficiently manufactured and marketed.

It is a further object of the present invention to provide a new and improved portable pet booster seat apparatus which is of durable and reliable construction.

An even further object of the present invention is to provide a new and improved portable pet booster seat apparatus which is susceptible of a low cost of manufacture with regard to both materials and labor, and which accordingly is then susceptible of low prices of sale to the consuming public, thereby making such portable pet booster seat apparatus available to the buying public.

Still yet a further object of the present invention is to provide a new and improved portable pet booster seat apparatus which can boost a pet in a motor vehicle without substantially immobilizing the pet.

Still another object of the present invention is to provide a new and improved portable pet booster seat apparatus that is readily usable in motor vehicles that have bench seats.

Yet another object of the present invention is to provide a new and improved portable pet booster seat apparatus which does not employ suspension straps for maintaining the pet in an elevated position with respect to a vehicle window.

Even another object of the present invention is to provide a new and improved portable pet booster seat apparatus that prevents a pet's front legs from moving off of the top surface of a booster support.

Still a further object of the present invention is to provide a new and improved portable pet booster seat apparatus which has a feature for engaging a portion of a seat belt or shoulder harness.

Yet another object of the present invention is to provide a new and improved portable pet booster seat apparatus that can also serve as a portable pet bed.

Still another object of the present invention is to provide a new and improved portable pet booster seat apparatus which has an easily removable and easily laundered cover.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a cross-sectional view of the embodiment of the portable pet booster seat apparatus of FIG. 2 taken along line 3—3 thereof.

FIG. 4 is a cross-sectional view of the embodiment of the portable pet booster seat apparatus of FIG. 2 taken along line 4—4 thereof.

DESCRIPTION OF THE PREFERRED EMBODIMENT

Figures 1, 2:
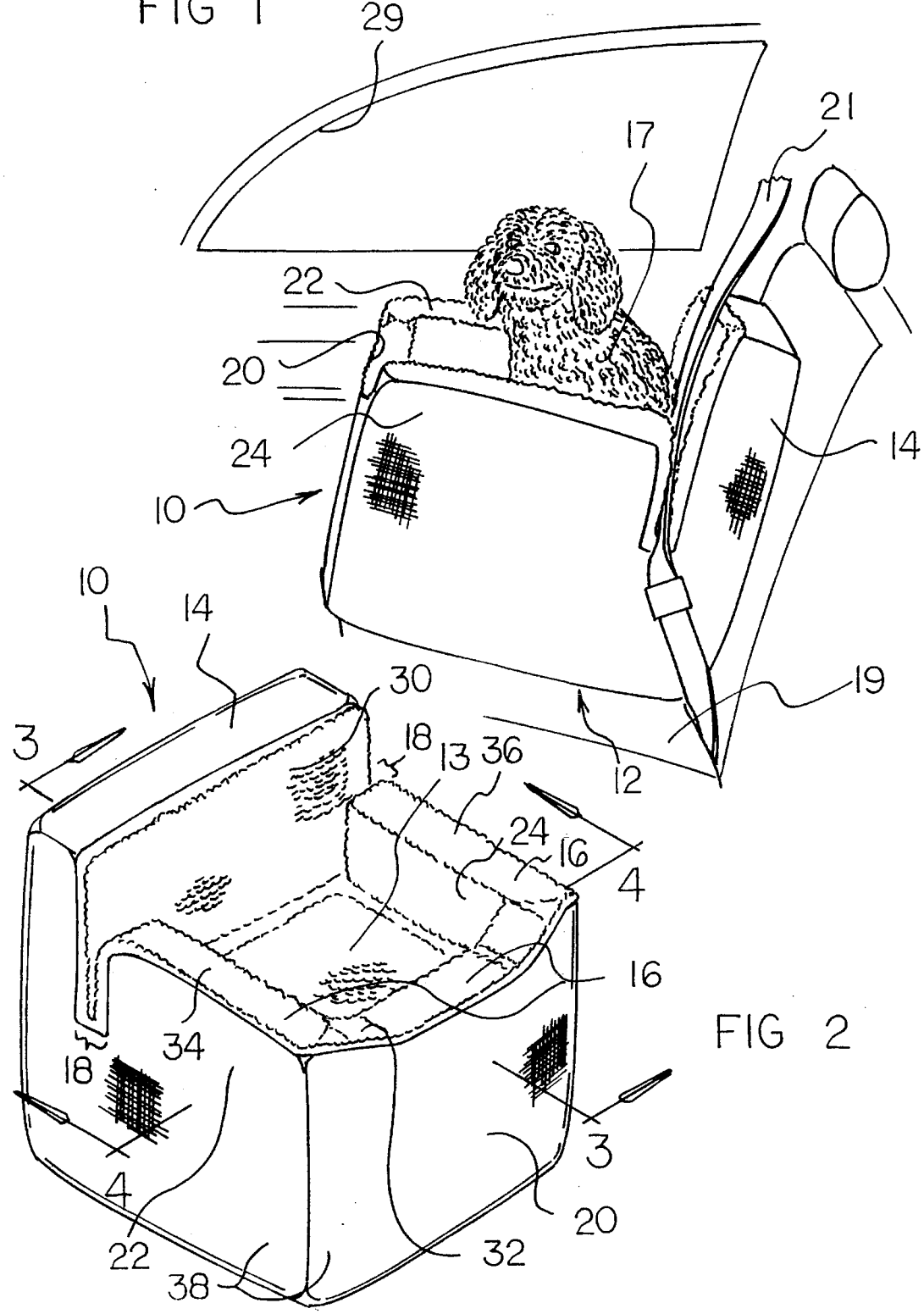
FIG. 1 is a perspective view showing a preferred embodiment of the portable pet booster seat apparatus of the invention in use on a seat of a motor vehicle, supporting a pet, and being secured to the vehicle seat by a shoulder harness.
FIG. 2 is another perspective view of the embodiment of the portable pet booster seat apparatus shown in FIG. 1 removed from the motor vehicle and not supporting a pet.
Figure 5:
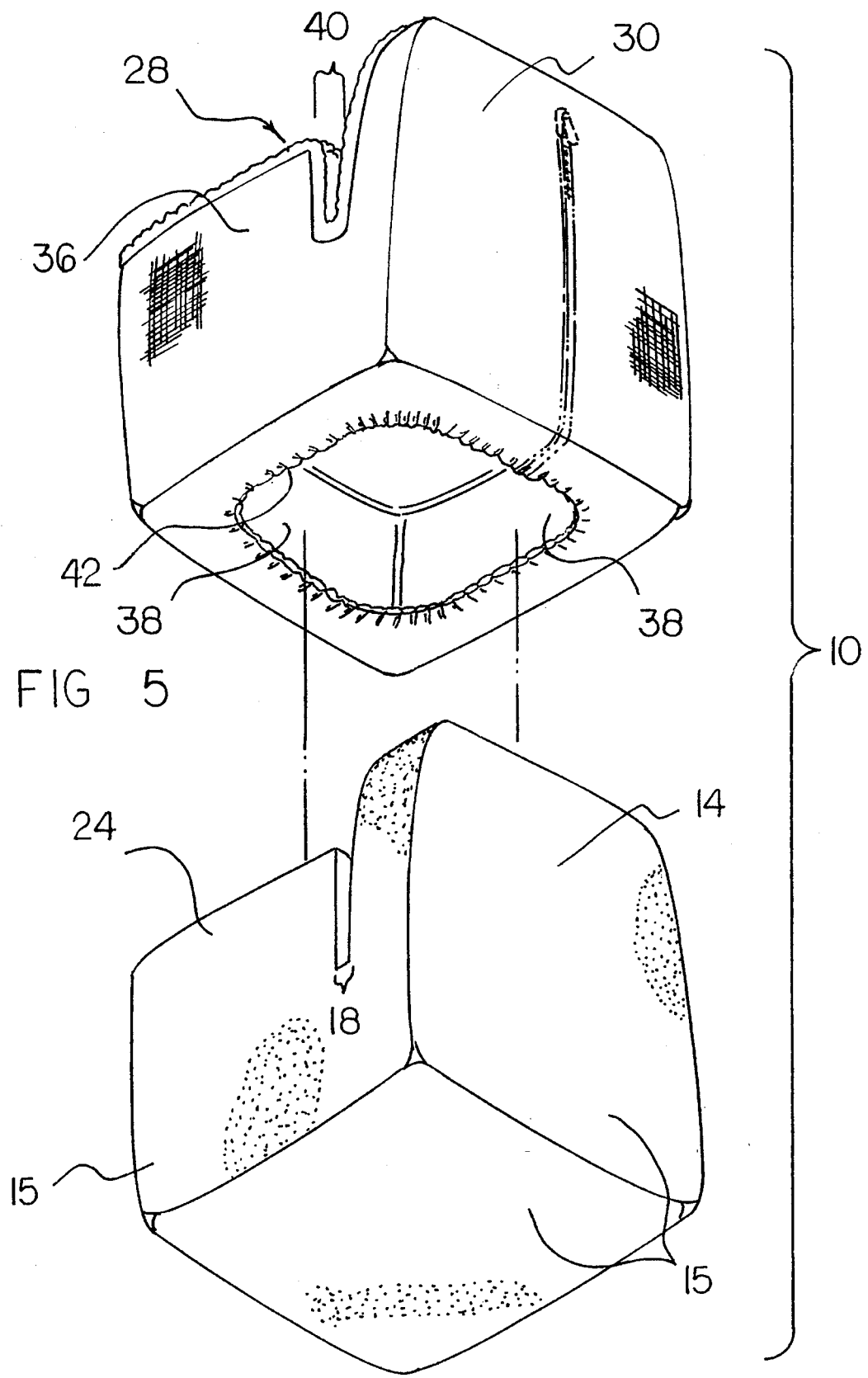
FIG. 5 is an exploded perspective view of the embodiment of the invention shown in the other figures, with the removable cover separated from the remainder of the apparatus.

With reference to the drawings, a new and improved portable pet booster seat apparatus embodying the principles and concepts of the present invention will be described.

Turning to FIGS. 1–5, there is shown an exemplary embodiment of the portable pet booster seat apparatus of the invention generally designated by reference numeral 10. In its preferred form, portable pet booster seat apparatus 10 includes a base portion 12 which includes a top surface 13 and a support portion 15. A first wall portion 14 is connected to the base portion 12 at a first peripheral portion of the base portion 12. The first wall portion 14 projects upward above the top surface 13 of the base portion 12. A second wall portion 16 is connected to the base portion 12 at a second peripheral portion of the base portion 12. The second wall portion 16 projects upward above the top surface 13 of the base portion 12. A pair of gaps 18 are provided between the first wall portion 14 and the second wall portion 16.

The base portion 12 includes four sides. The first wall portion 14 of the portable pet booster seat apparatus 10 extends along a first side of the base portion 12. The second wall portion 16 includes a first wall segment 20, a second wall segment 22, and a third wall segment 24. The first wall segment 20 extends along a second side of the base portion 12. The second wall segment 22 extends partially along a third side of the base portion 12 leaving a gap 18 between the second wall segment 22 and the first wall portion 14. The third wall segment 24 extends partially along a fourth side of the base portion 12 leaving a gap 18 between the third wall segment 24 and the first wall portion 14.

The base portion 12, the first wall portion 14, the first wall segment 20, the second wall segment 22, and the third wall segment 24 can be made as a unified integrated structure. Moreover, the unified, integrated structure can be made from a resilient foam material.

The portable pet booster seat apparatus 10 may also include a removable and replaceable cover assembly 28 which includes a first cover portion 30 for covering the first wall portion 14, a second cover portion 32 for covering the first wall segment 20 of the second wall portion 16, a third cover portion 34 for covering the second wall segment 22 of the second wall portion 16, a fourth cover portion 36 for covering the third wall segment 24 of the second wall portion 16, and a fifth cover portion 38 for covering the base portion 12. The cover assembly 28 includes a cover spacing 40 between the third cover portion 34 and the first cover portion 30 and includes a cover spacing 40 between the fourth cover portion 36 and the first cover portion 30. The cover assembly 28 includes an elastic portion 42 for securing the cover assembly 28 to the base portion 12. The cover assembly 28 can be made from a nylon quilt material.

In using the portable pet booster seat apparatus 10 of the invention, as shown in FIG. 1, the apparatus 10 is placed on the seat 19 of a motor vehicle. A pet 17 is seated on the top surface 13 of the base portion 12 of the apparatus 10. The base portion 12 is of a sufficient thickness so that when the pet 17 is seated on the top surface 13, the pet 17 is able to look out of the window 29 of the motor vehicle. The first wall portion 14 and the second wall portion 16 extend sufficiently above the top surface 13 of the base portion 12 so that the pet 17 cannot easily slip off of the top surface 13 of the base portion 12. A portion of shoulder strap 21 is placed in a gap 18 between the first wall portion 14 and the third wall segment 24 of the second wall portion 16. The shoulder strap 21 keeps the portable pet booster seat apparatus 10 of the invention secured to the seat 19. Alternatively. A seat belt can be used to keep the portable pet booster seat apparatus 10 secured to the seat 19 by using the gap 18.

The portable pet booster seat apparatus 10 of the invention can also serve as a bed for the pet 17. Both the first wall portion 14 and the second wall portion 16 extend above the top surface 13 of the base portion 12. As a result, the first wall portion 14 and the second wall portion 16 prevent a sleeping pet from rolling off of the top surface 13 of the base portion 12.

Moreover, because the pet booster seat apparatus 10 of the invention is very portable, the apparatus 10 can be used as a pet bed for any overnight stay, either at home or in a non-home location. If a pet 17 can use a familiar bed in an unfamiliar location, the pet 17 will have a greater likelihood of sleeping comfortably in the non-home location. The removable and replaceable cover assembly 28 can be made from a washable fabric that is readily laundered.

The components of the portable pet booster seat apparatus of the invention can be made from inexpensive and durable metal and plastic materials. Plastic foam and fibrous padding materials can also be employed.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved portable pet booster seat apparatus that is low in cost, relatively simple in design and operation, and which may advantageously be used to boost a pet in a motor vehicle without substantially immobilizing the pet. With the invention, a portable pet booster seat apparatus is provided which is readily usable in motor vehicles that have bench seats. With the invention, a portable pet booster seat apparatus is provided which does not employ suspension straps for maintaining the pet in an elevated position with respect to a vehicle window. With the invention, a portable pet booster seat apparatus is provided which prevents a pet's front legs from moving off of the top surface of a booster support. With the invention, a portable pet booster seat apparatus is provided which has a feature for engaging a portion of a seat belt or shoulder harness. With the invention, a portable pet booster seat apparatus is provided which can also serve as a portable pet bed. With the invention, a portable pet booster seat apparatus is provided which has an easily removable and easily laundered cover.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A portable pet booster seat apparatus, comprising:

a base portion which includes a top surface and a support portion, a first wall portion connected to said base portion at a first peripheral portion of said base portion, wherein said first wall portion projects upward above said top surface of said base portion, and a second wall portion connected to said base portion at a second peripheral portion of said base portion, wherein said second wall portion projects upward above said top surface of said base portion, wherein a pair of gaps are provided between said first wall portion and said second wall portion, wherein:
> said base portion includes four sides,
>
> said first wall portion extends along a first side of said base portion, and
>
> said second wall portion includes a first wall segment, a second wall segment, and a third wall segment,
>
> wherein said first wall segment extends along a second side of said base portion,
>
> wherein said second wall segment extends partially along a third side of said base portion leaving a gap between said second wall segment and said first wall portion, and
>
> wherein said third wall segment extends partially along a fourth side of said base portion leaving a gap between said third wall segment and said first wall portion, and further including a removable and replaceable cover assembly which includes:
> a first cover portion for covering said first wall portion,
>
> a second cover portion for covering said first wall segment of said second wall portion,
>
> a third cover portion for covering said second wall segment of said second wall portion,
>
> a fourth cover portion for covering said third wall segment of said second wall portion, and
>
> a fifth cover portion for covering said base portion.

2. The apparatus of claim 1 wherein said cover assembly includes a cover spacing between said third cover portion and said first cover portion and includes a cover spacing between said fourth cover portion and said first cover portion.

3. The apparatus of claim 1 wherein said cover assembly includes an elastic portion for securing said cover assembly to said base portion.

* * * * *